United States Patent [19]

Blaich

[11] Patent Number: 4,564,765
[45] Date of Patent: Jan. 14, 1986

[54] OPTOELECTRONIC METHOD AND APPARATUS FOR MEASURING THE BENDING ANGLE OF MATERIALS

[75] Inventor: Michael Blaich, Stuttgart, Fed. Rep. of Germany

[73] Assignee: Karl Mengele & Söhne GmbH & Co., Günzburg, Fed. Rep. of Germany

[21] Appl. No.: 489,852

[22] Filed: Apr. 29, 1983

[30] Foreign Application Priority Data

Apr. 29, 1982 [DE] Fed. Rep. of Germany ....... 3216053

[51] Int. Cl.⁴ .............................................. G01H 21/86
[52] U.S. Cl. ......................................... 250/561; 72/37
[58] Field of Search ............... 250/201, 560, 561, 577; 356/1, 4, 381, 384; 358/107; 364/563; 72/34, 37, 389

[56] References Cited

U.S. PATENT DOCUMENTS 3,807,870  4/1974  Kalman .................................... 356/1
4,227,813  10/1980 Pirlit ......................................... 356/1
4,298,286  11/1981 Maxey et al. ......................... 356/381
4,309,103  1/1982  Bodlaj ..................................... 356/4
4,349,274  9/1982  Steele .................................... 250/560
4,455,085  6/1984  Kato et al. ............................ 250/201

Primary Examiner—David C. Nelms
Assistant Examiner—J. Gatto
Attorney, Agent, or Firm—Toren, McGeady, Stanger, Goldberg & Kiel

[57] ABSTRACT

To achieve a greater accuracy, an optoelectronic measuring method and an apparatus for measuring with optoelectronic instruments provides that one or two light rays of one or two light transmitters, such as lasers, are directed at an acute angle onto a surface to be shaped and that the distance covered from the starting position to the end position in the shaping operations is measured by means of a photodetector, e.g., a diode camera, which is set up perpendicular to the light spot or spots.

4 Claims, 9 Drawing Figures

Fig. 4
DETAIL "X"

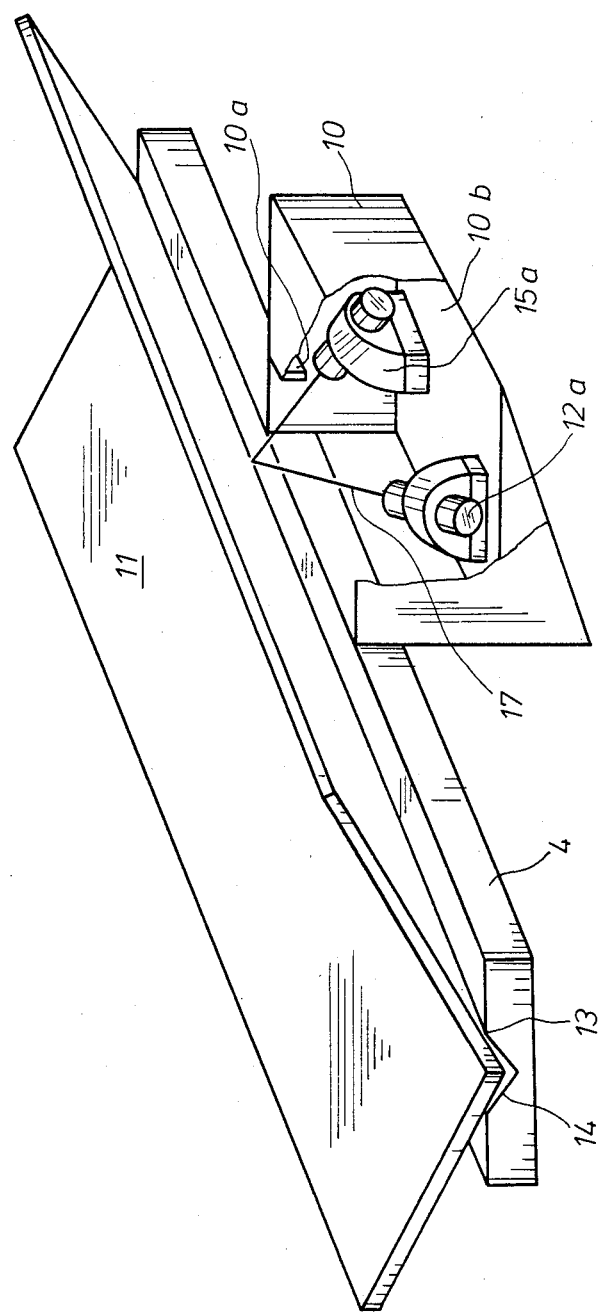

DETAIL "X"

$S_0, S_1$: MEASUREMENT FOR ANGLE

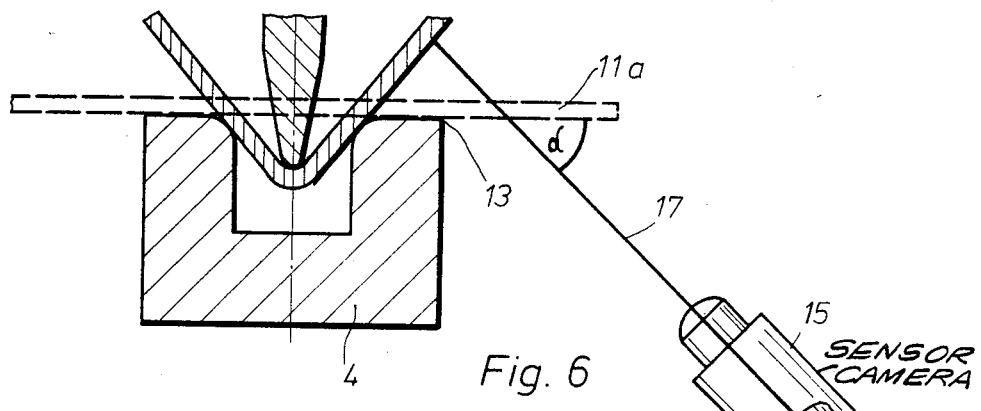
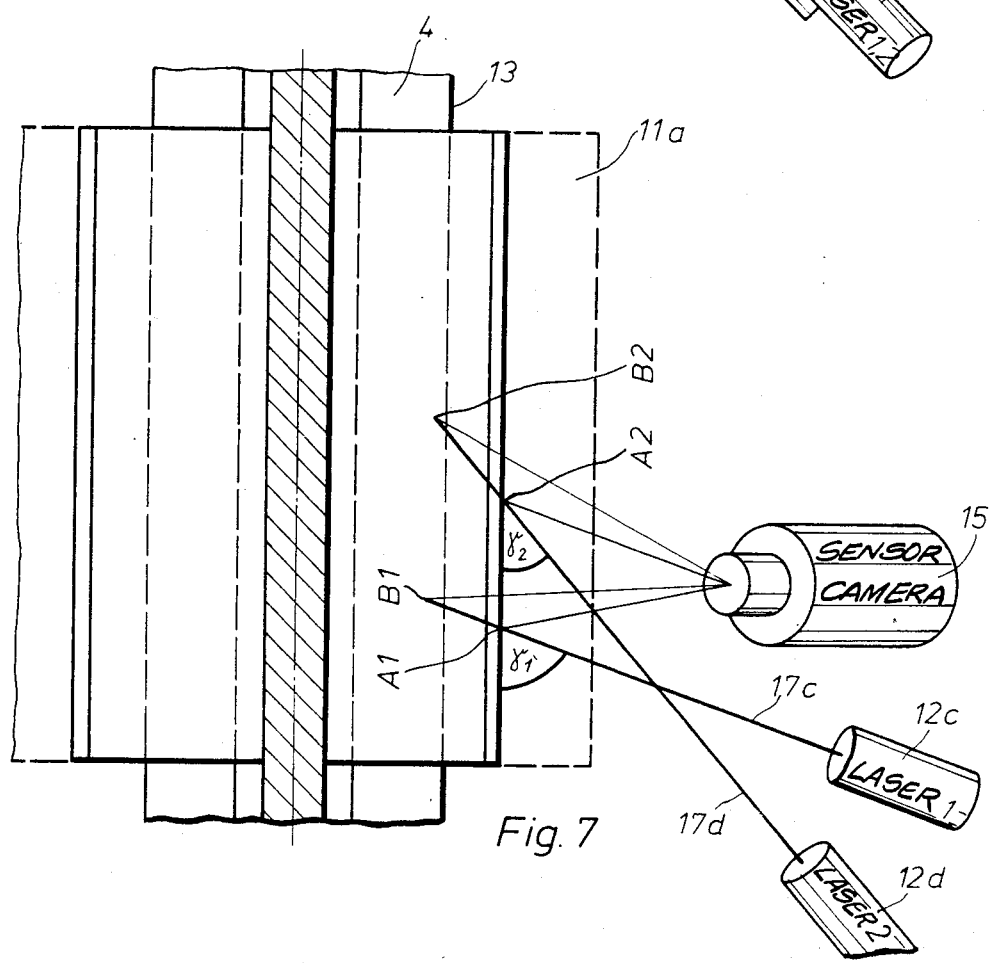

OPTOELECTRONIC METHOD AND APPARATUS FOR MEASURING THE BENDING ANGLE OF MATERIALS

The invention relates to an optoelectronic measuring method and an apparatus for measuring material deformations in processing machines, particularly of the bending angle in free bending die presses.

In the known optoelectronic measuring methods for noncontact measurement of products in production processes—cf. "Messen und Prüfen"/ *Automatik*, May 1981, pp. 290 ff.—the light source is perpendicular to the surface to be measured and the photodector is directed at an acute angle on the lighted surface. The projection of the change of distance ($\overline{AB}$) of the object of measurement is imaged via a lens system in the detector. The projection is smaller than the actual change of distance $\overline{AB}$. Because of the reduced projection, inaccuracies in measurement can occur, particularly because of material soiling and other characteristics of the lighted material surface which alter the light reflection.

For example, in bending processes on machines, such as free bending presses and die bending presses, such methods can not be applied. Here, dispersions of the material characteristics or of the sheet-metal thickness lead to large dispersions of the bending angle, even if it is ensured, by means of the control of the reforming machine, that the lower reversal point of the bending cheek (bending die) is accurately driven up to.

It is known (cf. DE-PS No. 20 44 199) to establish a determined index value of the angle by measuring the bending angle during the bending process and by means of a corresponding control of the machine via a control circuit. If necessary, one can also measure the springback after the load is relieved. Mechanical measuring methods have the disadvantage that the bending operations can be impeded because of their sensors.

Consequently, the object of the invention consists in providing a measuring method which is independent of changes of the lighted material surface and does not impede the bending operations, and which provides accurate measuring results in all lighting conditions.

The object of the invention is met in that one, at most, two light spot(s) is (are) produced on the deforming surface, such as the bending side of a sheet-metal plate, by means of at least one light source, such as a laser, infrared emitting diode, or the like, directed at an acute angle on the starting position of the surface and at an acute angle relative to the bending line; and in that the light spot or spots, the distance covered by the light spot or its configuration and the distance of the light spots from one another, respectively, is received by means of a photodetector, e.g., a diode line camera, which is set up at a distance and approximately perpendicular to the light spot or spots and the measured values are compared with the index value in a microprocessor and engaged by means of an actor controlling in the processing process, e.g., by means of the control of the immersion depth of the bending die.

In a development of the invention, a tapered light ray is bundled only to the extent that it forms an ellipse which elongates with increasing bending, wherein the alteration of the ellipse provides a measure for the position of the object of measurement, e.g., the bending side.

In another development of the measuring method according to the invention, two sharply bundled light spots are produced by two adjacently arranged light sources with intersecting or disparate ray axes, wherein the changing distance of the light spots from one another presents a measure for the material deformation.

In order to carry out the measuring method, according to the invention, in a free bending die press, at least one light source is arranged beneath the die plate in the area of one of the front faces of the latter in such a way that its light ray strikes the supporting sheet-metal plate from below, approximately in the center of the die plate at a slight lateral distance from the outer edge of the die plate and a photodetector lateral to the center of the die plate is directed to the projection area of the sheet-metal plate.

The invention is discussed and described in more detail in the drawing with the aid of an apparatus and its types of execution.

Shown are:

FIG. 1 is a perspective view of a die bending press with the measuring device, according to the invention;

FIG. 1a a perspective view of a part of FIG. 1;

FIG. 2 a sectional view of the die plate of the die bending press shown in FIG. 1, indicating measurement with a light spot;

FIGS. 6 and 7 are views similar to FIGS. 2 and 3 displaying another embodiment, according to the invention, and utilizing two light sources;

Figure 8:
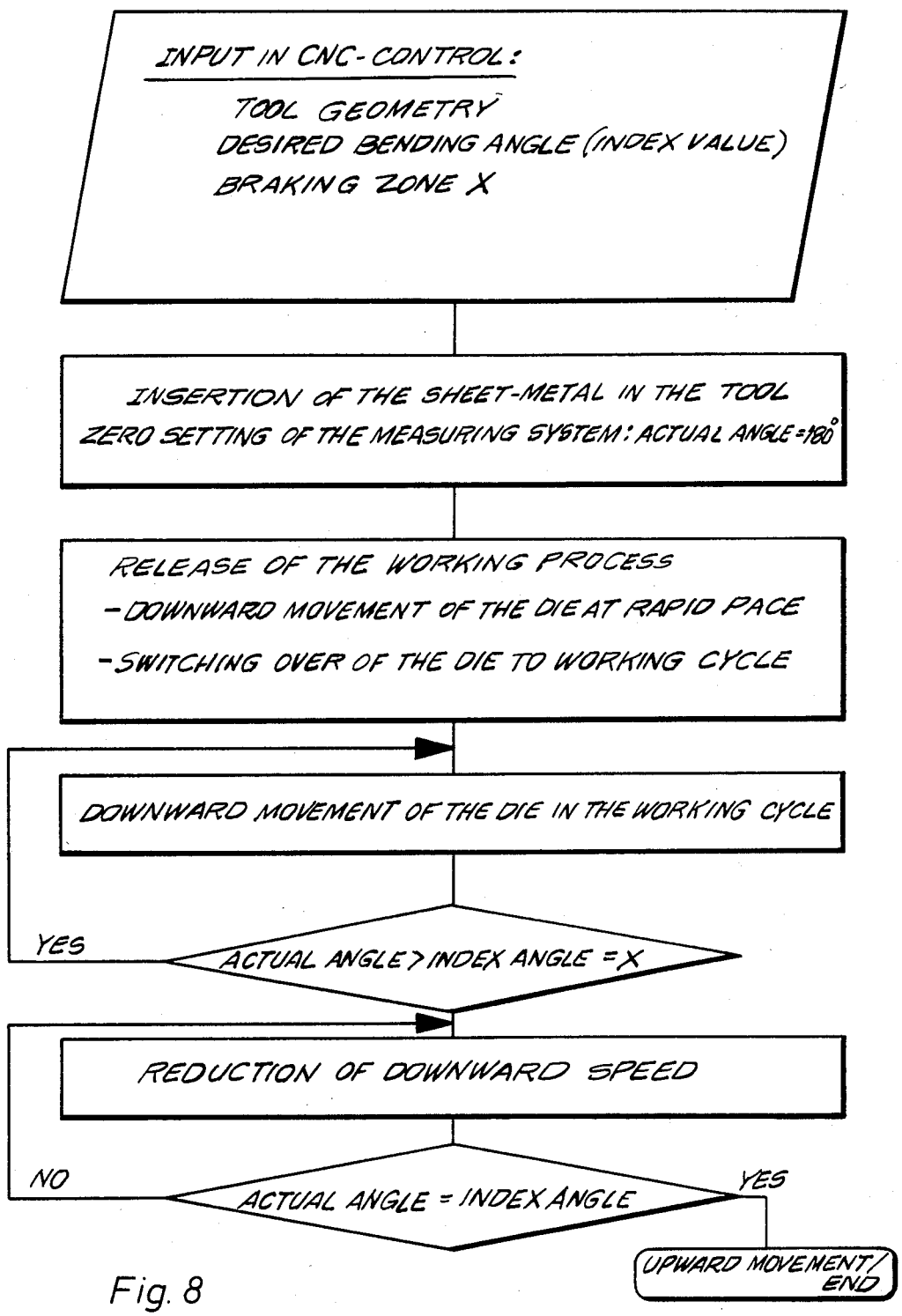

FIG. 8 a diagram of the steps involved in the method of the present invention.

Figure 1:
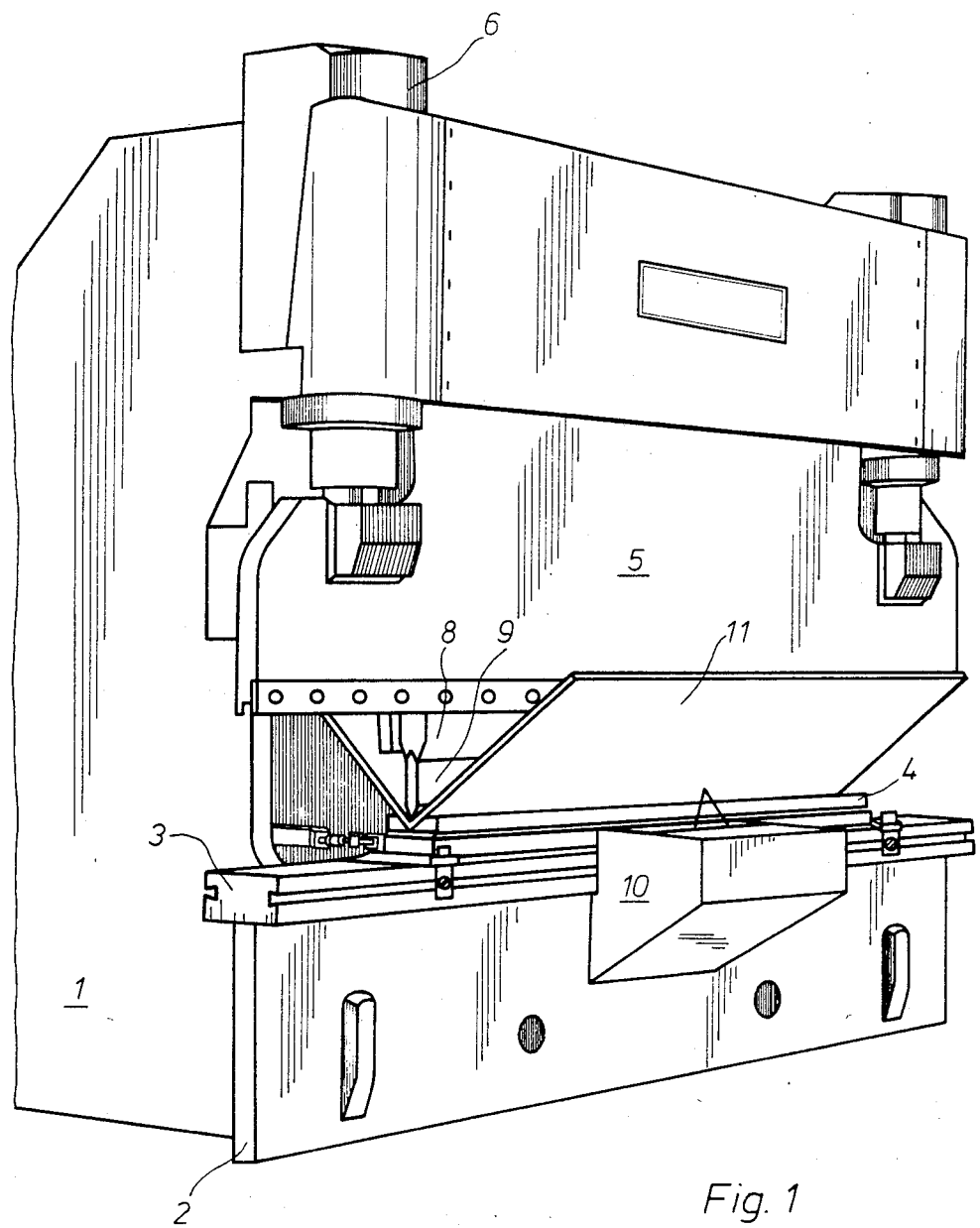

A free bending die press can be seen in FIG. 1 and partially in FIG. 1a. At supports 1, a lower cheek 2 is provided with a table 3 on which a die plate 4 is gripped. An upper cheek, which is driven by means of hydraulic cylinder piston units 6 and on whose ram 8 is fastened a die 9, is designated by 5. A housing having a glass wall 10a at its side opposite the die plate 4 is designated by 10.

As shown in FIG. 1a, the housing 10 serves to protect the devices mounted in it on a mounting plate 10b, the devices being a laser diode 12a and the diode line camera 15a. As can be seen, a light ray emitted from the laser diode strikes the sheet-metal plate not far from the outer edge 13 of the die plate 4 and is received by the diode camera 15a perpendicular to the bending axis in the area of its light spot.

In the following, various possibilities are described, which make possible a measuring of the bending angle during the bending process with the employment of optoelectronic methods.

Figure 2:
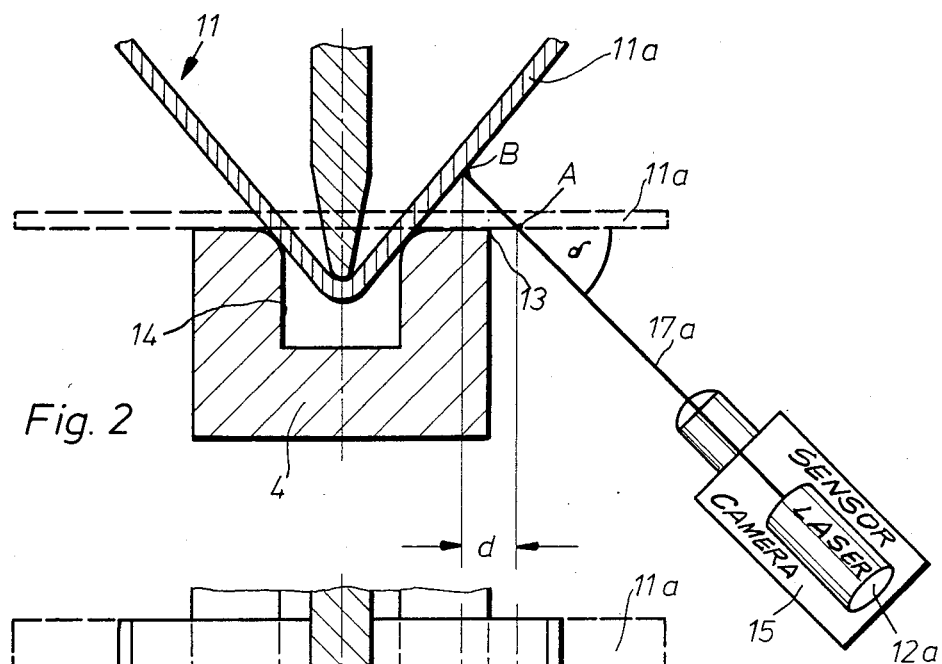
Figure 3:
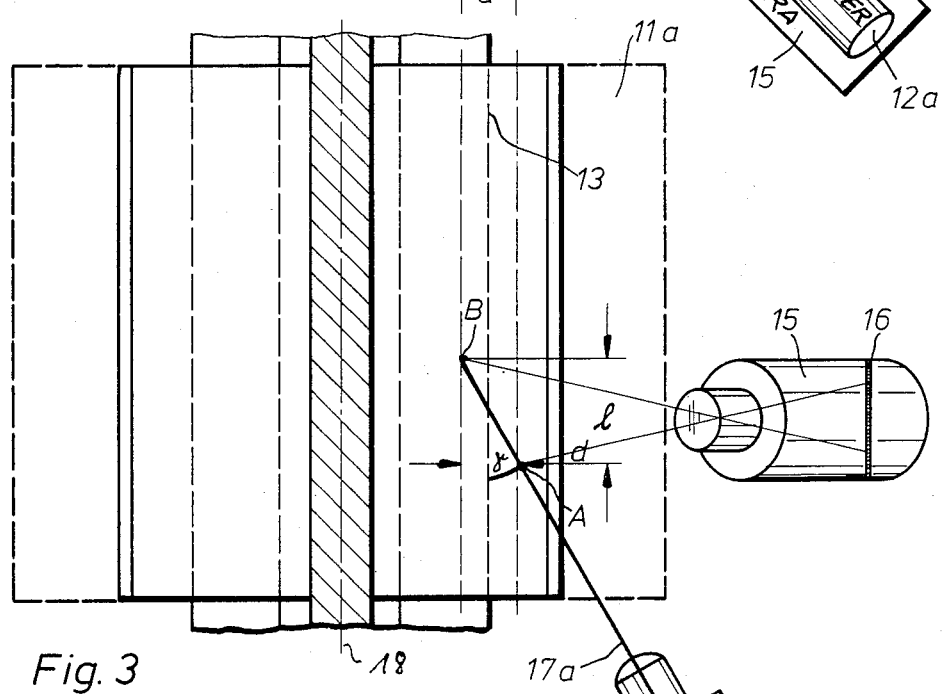
FIG. 3 is a top view partly in section of the arrangement illustrated in FIG. 2.

The measuring principle, according to FIGS. 2 and 3, is carried out as follows:

A light ray 17a of the smallest possible diameter and highest possible intensity strikes the level sheet-metal plate 11. The light ray 17a is directed to the sheet-metal plate 11 from the laser diode 12a at a determined angle relative to the bending axis in space ($\delta$) and, specifically, in the area of the subsequent side 11a, immediately adjacent to the outer edge 13 of the die plate 4 or through an opening at the die plate 4. A light spot A occurs on the sheet-metal plate 11. This light spot is viewed with the aid of a photodiode camera 15. The light-sensitive sensor line 16 of the camera is likewise arranged so as to be parallel to the bending axis 18 and forms a plane with the above-mentioned light ray 17a.

If the sheet-metal plate is bent, then the light spot wanders on the sheet-metal plate, e.g., from starting position A to another position B. The sensor line 16 detects those components of the path which extend parallel to the bending axis (distance l). To the extent that the geometrical relations of the bending process are known (geometry of the tool, angle of the light ray, incidence point in the starting position), the resulting bending angle can be concluded from the displacement of the light spot relative to the starting position A.

Figure 4:
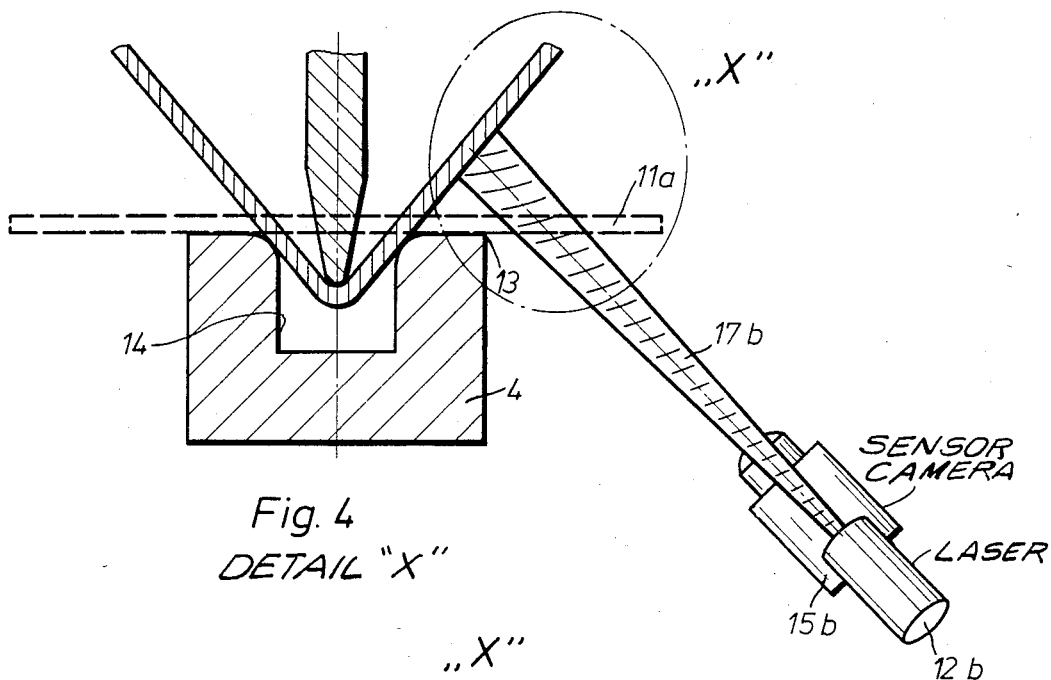
FIG. 4 is a side view of another embodiment of the invention.
Figure 5:
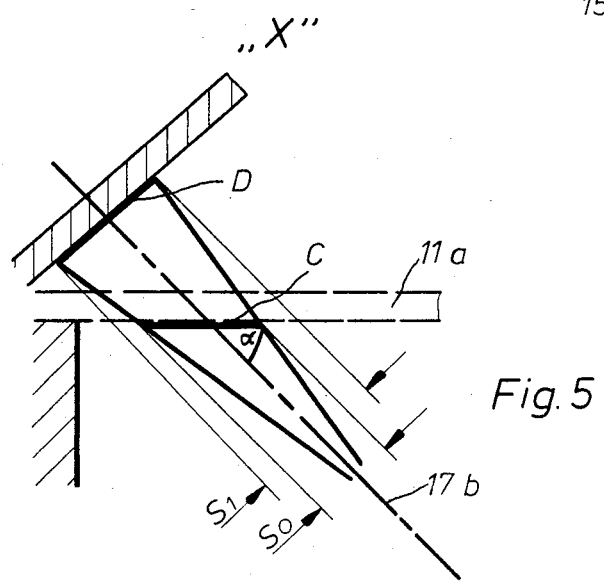
FIG. 5 illustrates the projection of the light ray image according to FIG. 4 (detail X)

The measuring method, according to FIGS. 4 and 5, is carried out with the use of the same structural elements as in the measuring principle according to FIGS. 2 and 3, but with the employment of a tapered light ray 17b of a greater diameter, which shows a conic section (ellipse) D on the sheet-metal surface. The change in diameter of the ellipse relative to the starting position C is measured. The diameter is preferably detected perpendicular to the bending axis (arrangement FIG. 5). The corresponding angle can be calculated with a knowledge of the diameter of the light ray 17b.

In the interest of the highest possible measuring accuracy, the width of the light spot is preferably grasped by the camera (preferably the points of transition from dark to light and from light to dark). The respective midpoint of the light spot can then be calculated in the subsequent evaluation from the initial and end coordinates of the light spot as a means value.

The measuring principle, according to FIGS. 6 and 7, is based on the utilization of two light rays 17c and 17d, which strike the sheet-metal plate in a plane at different angles $\delta_1/\delta_2$, each of them accordingly imaging a light spot $A_1$, $A_2$ or $B_1$, $B_2$. The sensor line of the observed photodiode camera 15 is likewise arranged in the area of the light spots $B_1$ and $B_2$, which are imaged on the sheet-metal plate 11.

The changing distance of the two spots is determined via the camera; the angle belonging to this distance can be calculated with a knowledge of the geometric conditions of the bending process and the arrangement of the light rays. In FIG. 8 the procedure for carrying out the method is shown diagrammatically. As the angle is measured during the bending operation in the die bending press initially the die plate is slowed as the measured angle approaches the index angle and then the bending operation is stopped when the measured angle equals the index angle.

I claim:

1. Optoelectronic measuring method for measuring the anglular displacement of a surface on a workpiece about a bending line extending along the surface of the workpiece, such as a sheet metal plate, from a starting position A on the surface of the workpiece before angular displacement to a displaced position B on the surface of the workpiece after angular displacement using a light beam from a light source, such as a laser, comprising the steps of directing the light beam from the light source at the position A at an acute angle relative to the surface of the workpiece and relative to the bending line and forming a light spot at the starting position A, continuously measuring the angle of reflection formed by the light beam from the light spot on the surface of the workpiece using a photo detector, such as a diode-line camera and positioning the photo detector approximately perpendicularly to the bending line during the angular displacement of the workpiece surface, and determining when the displaced position of the workpiece surface has been reached when the measured angle determined in the photo detector equals an index angle corresponding to the displaced position B.

2. Optoelectronic measuring method, as set forth in claim 1, including the step of using a tapered light ray bundled to the extent that the light spot formed on the workpiece surface forms an ellipse with the axis of the ellipse elongated as the workpiece surface is bent from the starting position A to the displaced position B.

3. Optoelectronic measuring method, as set forth in claim 1, comprising the step of using two separate light sources each forming a sharply bundled light spot on the workpiece surface with the two light sources being arranged adjacently and having one of intersecting and disparate ray axes.

4. Apparatus for the optoelectronic measuring of the angular displacement of the surface of a workpiece, such as a sheet metal plate, comprising a free bending die press including a die plate for bending the workpiece surface along a bending line so that the surface of the workpiece is angularly displaced about the bending line, a light source spaced outwardly from the workpiece surface and arranged to direct a light beam against the workpiece surface with the light beam forming an acute angle with the workpiece surface and with the bending line so that the light beam forms a light spot on the workpiece surface, and a photo detector spaced outwardly from the workpiece surface and from the light source and arranged approximately perpendicularly to the bending line and arranged to detect the angular displacement of the light spot formed on the workpiece surface as the workpiece surface is bent by said die plate.

* * * * *